United States Patent [19]

Vauchel

[11] Patent Number: 5,799,903
[45] Date of Patent: Sep. 1, 1998

[54] PIVOTING DOOR THRUST REVERSER WITH COOPERATING PANELS

[75] Inventor: Guy Bernard Vauchel, Le Havre, France

[73] Assignee: Societe Hispano Suiza, Colombes Cedex, France

[21] Appl. No.: 709,155

[22] Filed: Sep. 6, 1996

[30] Foreign Application Priority Data

Sep. 13, 1995 [FR] France .................................. 95 10699

[51] Int. Cl.⁶ .................................................. B64D 33/04
[52] U.S. Cl. ............................ 244/110 B; 239/265.33; 239/265.19; 239/265.25
[58] Field of Search ................... 244/110 B, 12.5, 244/23 D; 60/230, 226.2; 239/265.19, 265.33, 265.31, 265.29, 265.37, 265.25

[56] References Cited

U.S. PATENT DOCUMENTS

| | | |
|---|---|---|
| 3,483,702 | 12/1969 | Ward . |
| 3,739,582 | 6/1973 | Maison ................................ 60/230 |
| 4,030,291 | 6/1977 | Sargisson ........................ 239/265.29 |
| 4,216,923 | 8/1980 | Harris . |
| 4,698,964 | 10/1987 | Glancy ............................. 244/110 B |
| 4,960,243 | 10/1990 | Dubois et al. .................... 244/110 B |
| 5,040,730 | 8/1991 | Hogie et al. . |
| 5,054,285 | 10/1991 | Geidel et al. .................... 244/110 B |
| 5,097,662 | 3/1992 | Vieth ................................. 244/110 B |
| 5,267,438 | 12/1993 | Bunel et al. ..................... 244/110 B |

FOREIGN PATENT DOCUMENTS

| | | |
|---|---|---|
| 0 368 725 | 5/1990 | European Pat. Off. . |
| 2 650 861 | 2/1991 | France . |

*Primary Examiner*—Robert J. Oberleitner
*Assistant Examiner*—Tien Dinh
*Attorney, Agent, or Firm*—Bacon & Thomas

[57] ABSTRACT

A thrust reverser is disclosed for a turbojet engine having an outer cowling and an inner cowling forming a generally annular gas flow duct therebetween, the thrust reverser having at least one thrust reverser door pivotally attached to the outer cowling so as to pivot about a first stationary axis to move between a forward thrust position and a reverse thrust position, a thrust reverser panel pivotally attached to the inner cowling so as to pivot about a second stationary axis to move between a forward thrust position and a reverse thrust position, and a connector connecting the thrust reverser door and the thrust reverser panel such that when the thrust reverser door is in the reverse thrust position, the thrust reverser panel is in the reverse thrust position and when the thrust reverser door is in the forward thrust position, the thrust reverser panel is also in the forward thrust position.

12 Claims, 7 Drawing Sheets

PIVOTING DOOR THRUST REVERSER WITH COOPERATING PANELS

BACKGROUND OF THE INVENTION

The present invention relates to a thrust reverser for a turbojet engine, more particularly a thrust reverser for a turbofan-type turbojet engine having thrust reversing panels cooperating with thrust reverser doors.

Turbofan-type turbojet engines are well known in the art and typically comprise a fan driven at the front of the turbojet engine which directs a flow of bypass air through a duct bounded by the engine cowling on the inside and a fan cowling on the outside. The generally annular duct bounded by the engine cowling and the fan cowling may channel both the bypass flow and the primary exhaust gas flow at a downstream portion from the turbojet engine, or may channel only the bypass flow.

In aircraft on which the turbojet engine is mounted outside of the airframe structure, the fan cowling and the engine cowling are configured to form boundaries of the bypass flow duct and to provide aerodynamic outer surfaces to reduce drag.

Figure 1:
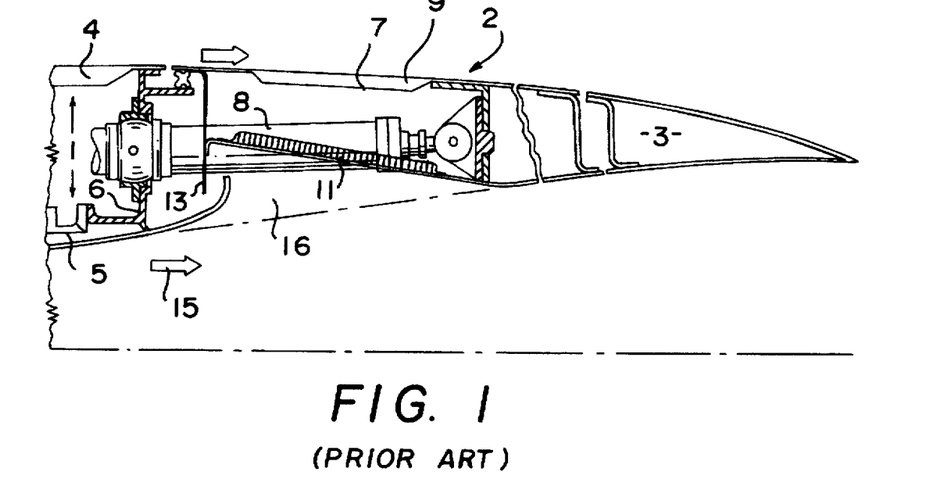
FIG. 1 is a partial, cross-sectional view of a known pivoting door thrust reverser with the door in the closed or forward thrust position.
Figure 2:
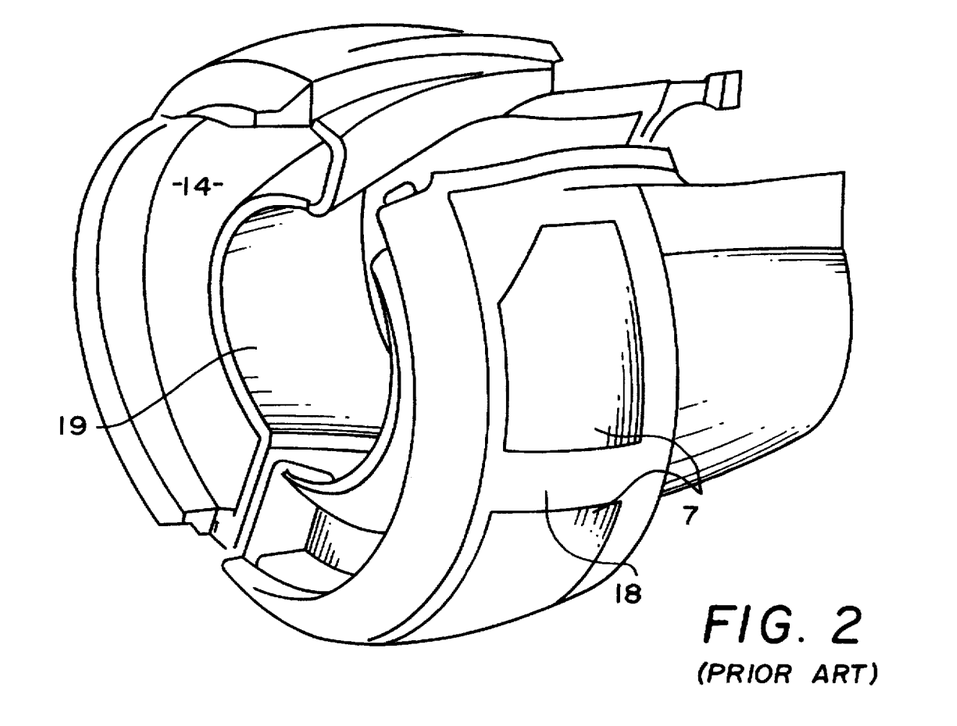
FIG. 2 is a perspective view of a turbofan-type turbojet engine incorporating the known thrust reverser of FIG. 1.

FIGS. 1 and 2 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) is designated as 1 and generally comprises an external cowling panel 4 and an internal cowling panel 5 interconnected by a frame 6. The outer surface of the external cowling panel 4 has an aerodynamic surface over which the air external to the engine passes during aircraft flight. The inner surface of the inner cowling panel 5 defines the outer boundary of the bypass flow duct through which the bypass flow air passes in the direction of arrow 15.

The fan cowling also comprises a thrust reverser, illustrated generally at 2, and a downstream fairing 3. The thrust reverser 2 comprises a door 7 pivotally attached to the cowling such that it is movable between a closed, forward thrust position, illustrated in FIG. 1, and an open, reverse thrust position in which the upstream end (towards the left as viewed in FIG. 1) of the thrust reverser door 7 is moved outwardly from the cowling, while a downstream portion is moved inwardly into the bypass flow duct airstream so as to redirect at least a portion of the bypass flow laterally through an opening in the fan cowling in a direction which has a reverse thrust component.

An actuator 8 for moving the door 7 between its forward thrust and reverse thrust positions may comprise a hydraulic cylinder extending through and mounted to the frame 6 and having an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel 4 and the downstream fairing 3.

As illustrated in FIG. 2, a plurality of thrust reverser doors 7 may be incorporated into the fan cowling, such doors being circumferentially spaced around the periphery of the fan cowling. A portion 18 of the fan cowling extends axially between adjacent thrust reverser doors 7 to provide structural rigidity to the fan cowling and to provide pivot mounting points for attaching the doors 7 to the fan cowling. French Patents 1,482,538 and 2,030,034 illustrate typical, known thrust reversers.

U.S. Pat. No. 3,605,411 discloses a pivoting door-type thrust reverser in which the deflector mounted to the upstream or forward end of the thrust reverser door is movable to an extended position when the door is in the reverse thrust position.

French Patent 2,618,853 discloses a thrust reverser in which the deflector is retracted when the door is in its forward thrust position to optimize engine performance.

In some applications, as illustrated in FIG. 1, the deflectors 13 project from the inner panel of the thrust reverser door 7 even when the door is in its forward thrust position without extending into the bypass flow duct. This forms a cavity 16 facing inwardly into the bypass flow duct which will slightly degrade engine performance.

French Patent 2,680,547 discloses a thrust reverser having a combination of spoilers and deflectors to attempt to optimize the direction of exhaust flow.

The above-described known thrust reversers incur major drawbacks because of the aerodynamic size constraints on the flow passages cleared by the upper portion of the thrust reverser doors which cause the doors to be biased in the open, thrust reversing direction. The full cross-section of the flow passages must be larger than the associated duct cross-section in a plane taken upstream, or forward, of the door on account of the pressure losses due to the gas flow deflection since the unobstructed downstream, or rearward portion of the duct unobstructed by the inwardly protruding portion of the thrust reverser doors is minimized in order to produce an appropriate reverse thrust force.

Quite obviously, the bias of the doors toward the open or reverse thrust position is a safety drawback. The reverser would be safer if the pressure applied to the thrust reverser door biased the door towards the closed or forward thrust position. This consideration also applies to thrust reverser doors that would tend to close again under pressure even if they were partially deployed towards the thrust reversing position.

In some cases, the effect of the pressure is such that very high stresses are transmitted through the thrust reverser door actuators between their attachment points to the upstream portion of the cowling and the doors. As a consequence, this structure and the door locking mechanisms must be undesirably heavy.

SUMMARY OF THE INVENTION

A thrust reverser is disclosed for a turbojet engine having an outer cowling and an inner cowling forming a generally annular gas flow duct therebetween, the thrust reverser having at least one thrust reverser door pivotally attached to the outer cowling so as to pivot about a first stationary axis to move between a forward thrust position and a reverse thrust position, a thrust reverser panel pivotally attached to the inner cowling so as to pivot about a second stationary axis to move between a forward thrust position and a reverse thrust position, and a connector connecting the thrust reverser door and the thrust reverser panel such that when the thrust reverser door is in the reverse thrust position, the thrust reverser panel is in the reverse thrust position and when the thrust reverser door is in the forward thrust position, the thrust reverser panel is also in the forward thrust position.

The thrust reverser according to the present invention has each thrust reverser door linked to a movable thrust reverser panel which is, in its closed, or forward thrust position, integrated into the inner cowling, which may be the cowling of the turbojet engine so as to form a generally continuous inner wall bounding the annular flow duct for the cold flow, or fan generated gas flow. When in the reverse thrust positions, the panel moves into the annular duct so as to cooperate with the thrust reverser door to achieve efficient redirection of the gases passing through the annular duct so as to generate a reverse thrust force.

The thrust reverser panel, which may be pivotally attached to the inner cowling at either a front portion or at a rear portion, may be driven or operated by movement of the thrust reverser door having an actuator attached thereto. Alternatively, the actuator may be located within the inner cowling and be connected to the thrust reverser panel such that movement of the thrust reverser panel also causes movement of the thrust reverser door.

DETAILED DESCRIPTION OF THE PREFERRED EMBODIMENTS

In the embodiments of the thrust reverser according to the present invention, elements having the same functions as those in the known thrust reversers have been assigned the same identifying numerals. Thus, it can be seen in FIG. 3 that thrust reverser door 7 is, as in the known prior art, pivotally attached to the outer cowling 1 so as to be movable between forward and reverse thrust positions about stationary pivot axis 20. Stationary pivot axis 20 extends generally transversely to the longitudinal axis of the turbojet (not shown). The inner cowling 19 which forms the inner boundary of the annular gas flow duct 14 encloses the turbojet engine (not shown). The gases flow through the duct from the upstream to the downstream direction (from left to right as illustrated in FIG. 3) in the direction of arrow 15 when the thrust reverser door and the thrust reverser panel are in their forward thrust positions.

The thrust reverser door 7 pivots between the forward thrust and reverse thrust positions by pivot attachments to the portions 18 of the outer cowling (illustrated in FIG. 2) so as to pivot about stationary axis 20.

Figure 3:
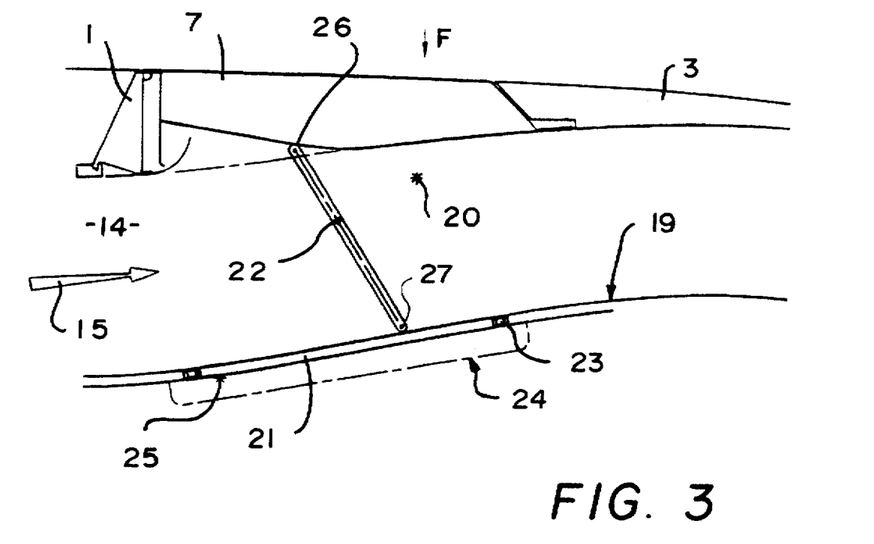
FIG. 3 is a partial, schematic, cross-sectional view of the thrust reverser according to the present invention with the thrust reverser door and thrust reverser panel in their forward thrust positions.

A thrust reverser panel 21 is pivotally attached to the inner cowling 19 and, in its forward thrust position as illustrated in FIG. 3, is substantially flush with the bounding surface of the inner cowling 19 so as to present a substantially uninterrupted boundary for the annular flow duct 14. The thrust reverser panel 21 is connected to a thrust reverser door 7 by any mechanical means, linkrod 22 being illustrated in the figures. Linkrod 22 is pivotally connected to the thrust reverser door 7 by pivot 26 and is pivotally connected to the thrust reverser panel 21 by pivot 27.

Seals 23 are located between the thrust reverser panel 21 and the adjacent edges of inner cowling 19 so as to prevent leakage of the gases in the gas flow duct 14 into the inner cowling 19 when the thrust reverser panel 21 is in the forward thrust position. To further prevent leakage into the interior of the inner cowling 19, a fairing 24 may be mounted on an inner surface of the inner cowling 19 so as to prevent passage of gases into the inner cowling 19 when the thrust reverser panel 21 is moved to the reverse thrust position. Apertures or openings may be provided in the fairing 24, or this fairing 24 may be eliminated altogether, in order to achieve complementary aeration of the turbojet engine compartment during thrust reversal, or in the course of a flight phase in which limited opening of the thrust reverser door and thrust reverser panel 21 takes place.

A locking and/or signalling system for the thrust reverser panel 21 may be incorporated on the inner portion of the inner cowling 19. The locking system, in known fashion, will releasably lock the thrust reverser panel 21 in the forward thrust position until it is desired to effect a thrust reversal. Similarly, a known signalling system may be utilized to indicate any malfunction of the locking system, or improper positioning of the thrust reverser panel 21.

The thrust reverser panel 21 is pivotally attached to the inner cowling 19 so as to pivot about a second stationary axis 25 between the forward thrust and reverse thrust positions. The panel 21 can be pivotally attached to beams forming a portion of the inner cowling 19 in known fashion.

Figure 4:
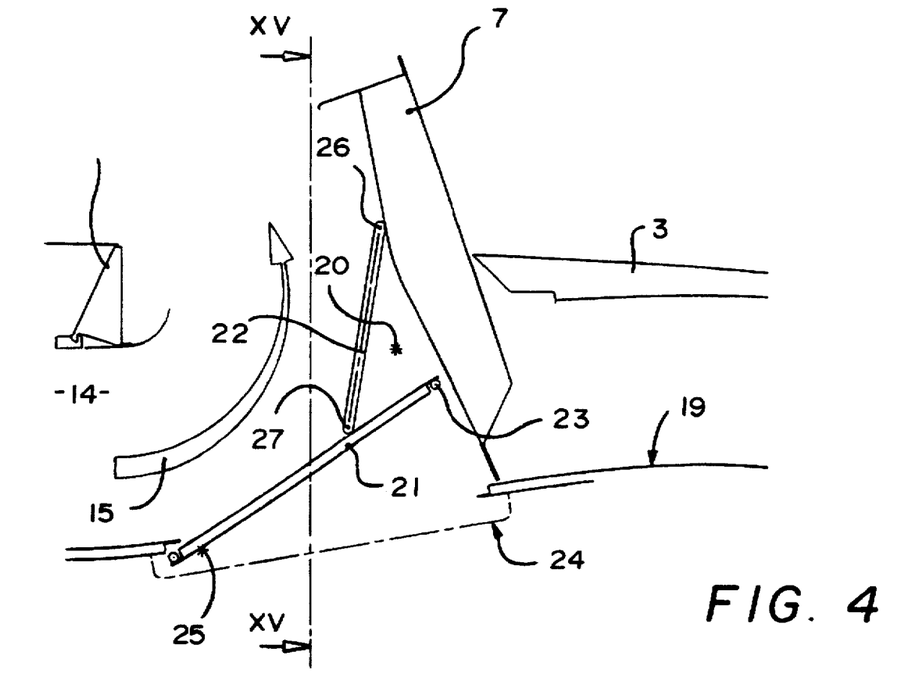
FIG. 4 is a view similar to FIG. 3, but illustrating the thrust reverser door and the thrust reverser panel in their reverse thrust positions.
Figure 5:
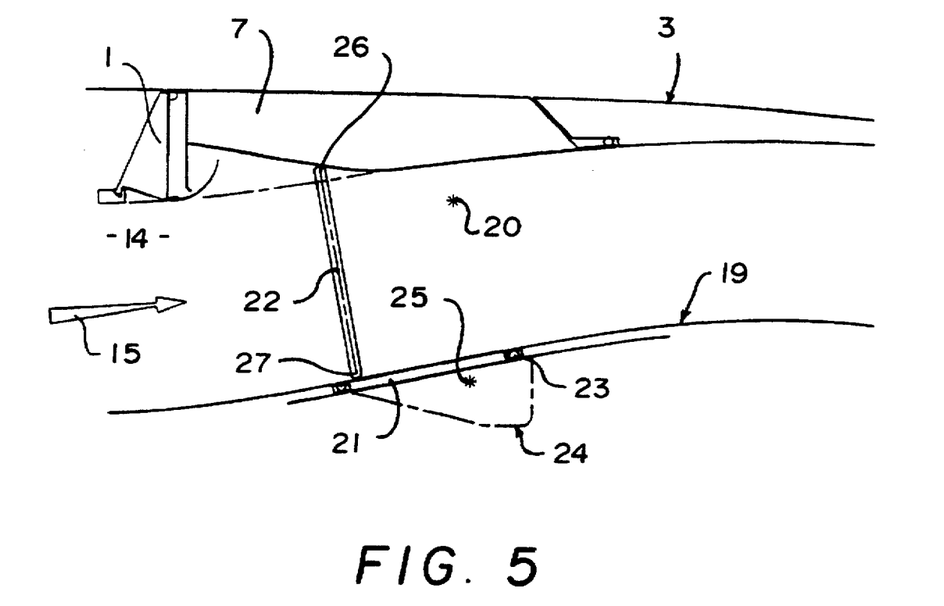
FIG. 5 is a partial, schematic, cross-sectional view illustrating a second embodiment of the thrust reverser according to the present invention with the thrust reverser door and thrust reverser panel in their forward thrust positions.
Figure 6:
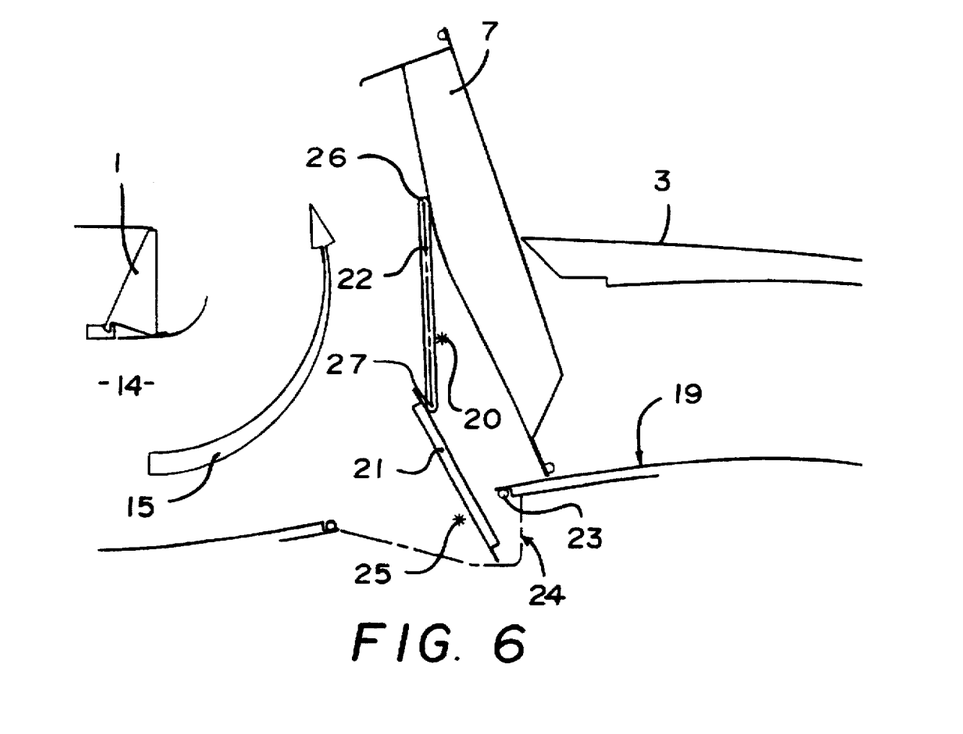
FIG. 6 is a view similar to FIG. 5, but illustrating the thrust reverser door and the thrust reverser panel in their reverse thrust positions.

Depending upon the particular application and whether or not a self-closing biasing force is desired for the thrust reverser door 7, the pivot axis 25 may be located adjacent to a forward portion of the thrust reverser panel 21, as illustrated in FIGS. 3, 4 and 7–10, or it can be located adjacent to a rear portion of the thrust reverser panel as illustrated in FIGS. 5 and 6. Quite obviously, a position of the pivot axis 25 between these two extreme positions may also be utilized without exceeding the scope of this invention.

In the embodiment illustrated in FIGS. 3 and 4, linkrod 22 serves as the drive for the thrust reverser panel 21 since, in this embodiment, the actuator 8 is operatively connected to the thrust reverser door 7 as illustrated in FIG. 1. As illustrated in FIG. 4, movement of the thrust reverser door 7 to its reverse thrust position will also cause the rear portion of the thrust reverser panel 21 to extend into the annular duct 14 so as to move the thrust reverser panel 21 to its reverse thrust position. The thrust reverser panel 21 and the interior of the thrust reverser door 7 provides an aerodynamic contour to redirect the gas flow 15 outwardly through the outer cowling 1 to provide the requisite reverse thrust force.

Linkrod 22 is pivotally connected to the thrust reverser door 7 by pivot 26 located between the forward or upstream edge of the door 7 and the stationary pivot axis 20 and is pivotally connected to the thrust reverser panel 21 by pivot 27 located between the pivot axis 25 and the rear of the thrust reverser panel 21. The linkrod 22 is positioned such that the optimal stress transmission between the thrust reverser door 7 and the thrust reverser panel 21 will be achieved. Accordingly, the linkrod may be oriented perpendicularly to the gas flow extending through the annular duct 14 or at any desired slant angle, depending upon the particular application needs. In order to minimize any disturbances in the gases flowing through the annular duct 14, aerodynamic fairings (not shown) may be located around the pivots 25 and 26.

Use of the thrust reverser door and a cooperating thrust reverser panel enable the cowling structures to be made lighter, particularly the stationary upstream structure 1. In particular, it is possible to relocate the known locking systems, which were previously mounted on the stationary structure 1 so as to act on the thrust reverser door 7, to the inner cowling 19 such that they may act on the thrust reverser panel 21.

Since the stationary pivot axis 25 is located at a front portion of the thrust reverser panel 21, the forces generated by the gas pressures within the duct 14 will urge the thrust reverser panel 21 and, consequently, the thrust reverser door 7 toward their forward thrust positions. These forces are balanced against the forces exerted by the gas flow 15 on the forward portion of the thrust reverser door 7 to balance the stresses applied to the thrust reverser door 7 and the thrust reverser panel 21 during the extension phase, which balanced forces allows the lightening of the displacement control system.

In the embodiment illustrated in FIGS. 5 and 6, similar elements have been assigned the same identifying numerals as in the previously described embodiment. In this embodiment, the thrust reverser panel 21 is pivotally attached to the inner cowling 19 so as to pivot about axis 25 which is located adjacent a rear portion of the panel 21. As can be seen in FIG. 6, with this orientation, the thrust reverser panel 21 and the thrust reverser door 7 pivot about their respective axis in the same direction when moving between the forward and reverse thrust positions, contrary to the previously described embodiment in which the thrust reverser panel 21 and the thrust reverser door 27 moved in opposite directions about their respective axes when moved between the forward and reverse thrust positions. When the pivot axis 25 is located adjacent to the a rear portion of the panel 21, the forward portion of the panel 21 extends into the annular duct 14 when the panel is in its reverse thrust position. In this embodiment, as in the previously described embodiment, the actuator is attached between the outer cowling 1 and the thrust reverser door 7 and linkrod 22 transfers the motion of the door 7 to the panel 21. Again, fairing 24 may be provided on the inner wall of the inner cowling 19 to prevent leakage of gases into the inner cowling 19 from the annular flow duct 14. Seals 23 may be also be utilized as in the previously described embodiment.

Figure 7:
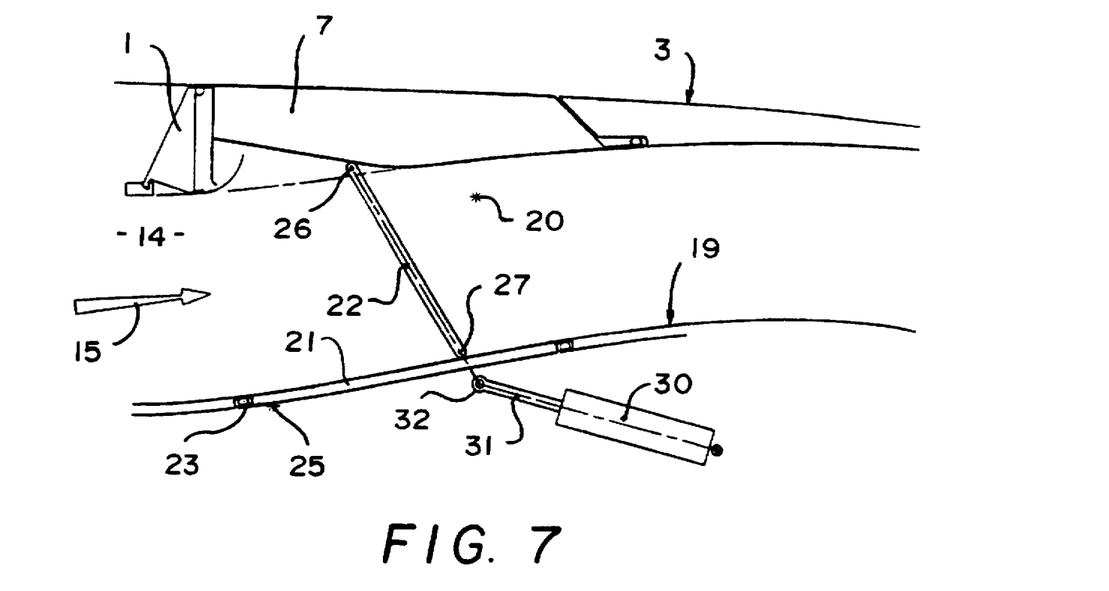
FIG. 7 is a partial, schematic, cross-sectional view of a third embodiment of the thrust reverser according to the present invention illustrating the thrust reverser door and thrust reverser panel in their forward thrust positions.
Figure 8:
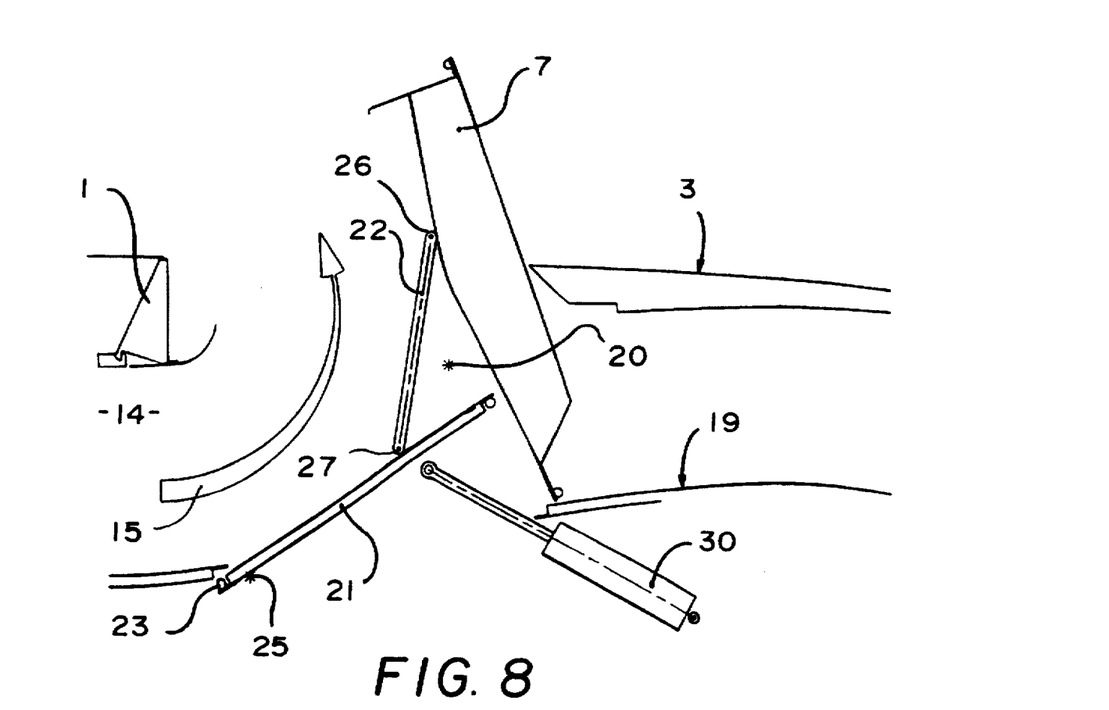
FIG. 8 is a view similar to FIG. 7, but illustrating the thrust reverser door and the thrust reverser panel in their reverse thrust positions.

A third embodiment of the invention is illustrated in FIGS. 7 and 8. Again, elements having the same function as those in the previously described embodiments have been assigned the same identifying numerals. The difference between this embodiment and those previously described comprises actuator 30 which is connected between the inner cowling 19 and the thrust reverser panel 21. The actuator 30 may comprise a pneumatic, hydraulic, electric, or other known actuator and may have a linearly extendable and retractable rod 31 that is pivotally connected to the thrust reverser panel 21 at pivot 32. Thus, in this particular embodiment, the panel 21 is the driving member and the door 7 is the driven member which is driven through linkrod 22. Pivot 32 is located between the pivot axis 25 and the rear portion of the thrust reverser panel 21. Preferably, the pivot 32 is located adjacent to the pivot 27 on opposite sides of the thrust reverser panel 21. Again, extension of the rod 31 will cause the rear portion of the thrust reverser panel 21 to extend into the annular duct 14 and will cause the thrust reverser door 7 to pivot about its pivot axis 20 to the position illustrated in FIG. 8. Although the actuator 30 is illustrated as being located in a downstream or rearward direction from the thrust reverser panel 21, quite obviously the actuator may be located upstream or forwardly of the panel, or at any other desired orientation without exceeding the scope of this invention.

This embodiment obviates one of the drawbacks of the known system insofar as the actuator 30 and the rod 31 do not intrude or extend into the opening in the outer cowling 1 through which the thrust reversing gases 15 are directed. This enables the thrust reversing gas flow to be accomplished more smoothly than the known prior art systems.

The use of the thrust reverser panel 21 also improves operational efficiency in the reverse thrust mode. As illustrated in FIGS. 4 and 8, the orientation of the panel 21 provide a relatively smooth transition for the redirection of the gas flow 15 to the exterior of the outer cowling.

Figure 9:
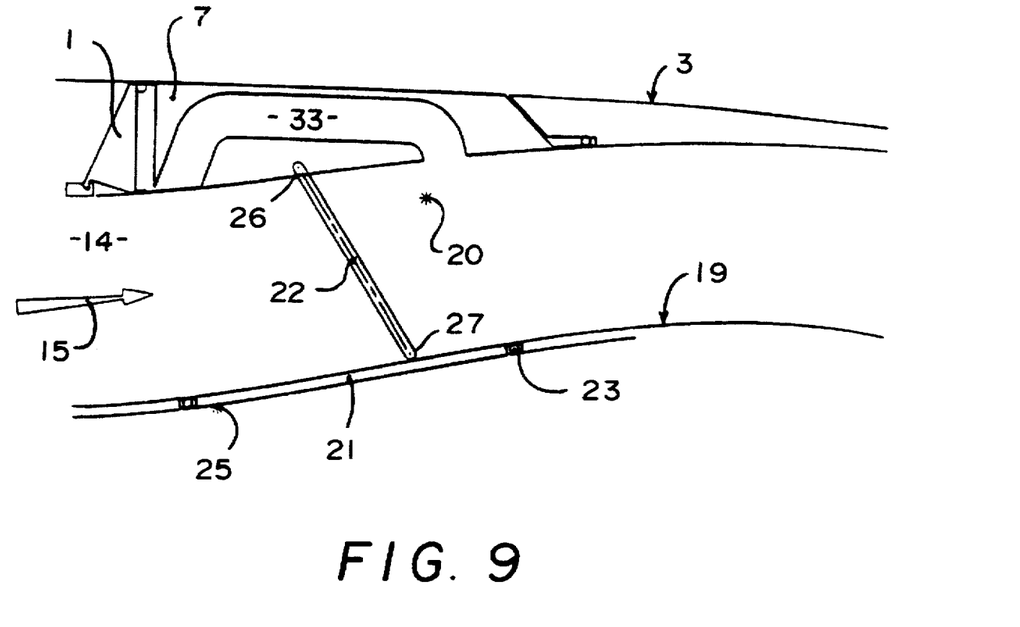
FIG. 9 is a partial, schematic, cross-sectional view illustrating an alternative embodiment of the thrust reverser according to the present invention with the thrust reverser door and the thrust reverser panel in the forward thrust positions.
Figure 10:
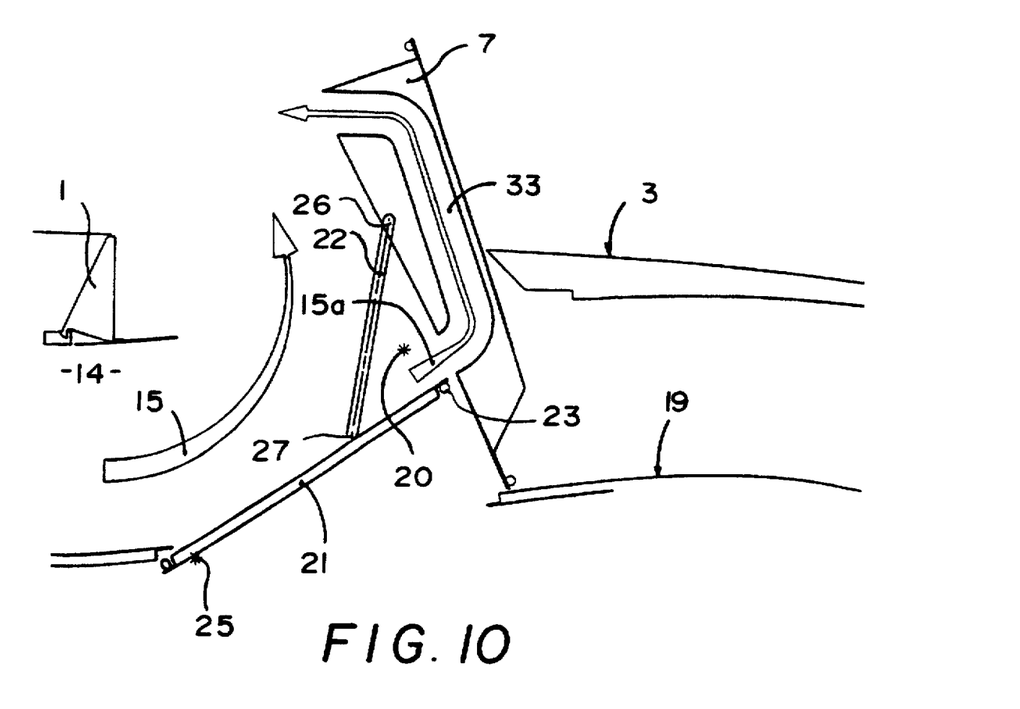
FIG. 10 is a view similar to FIG. 9, but illustrating the thrust reverser door and the thrust reverser panel in their reverse thrust positions.
Figure 11:
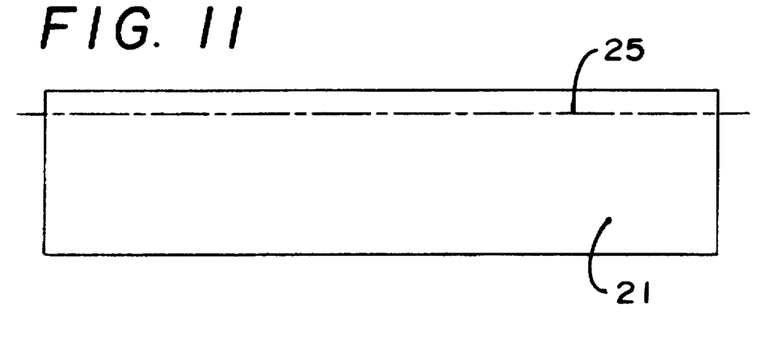
FIG. 11 is a plan view of a thrust reverser panel.
Figure 12:
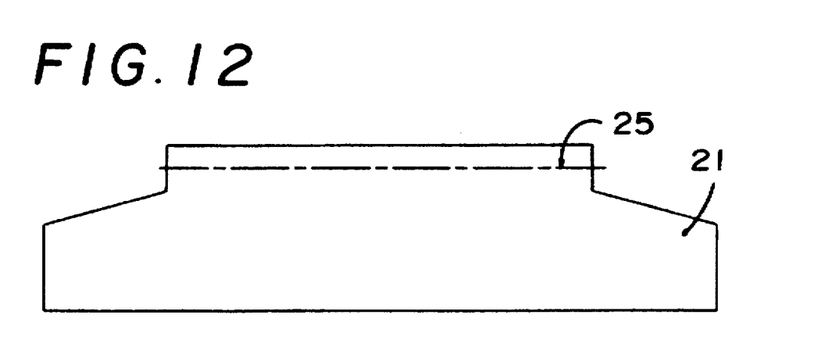
FIG. 12 is a plan view of an alternative thrust reverser panel.
Figure 13:
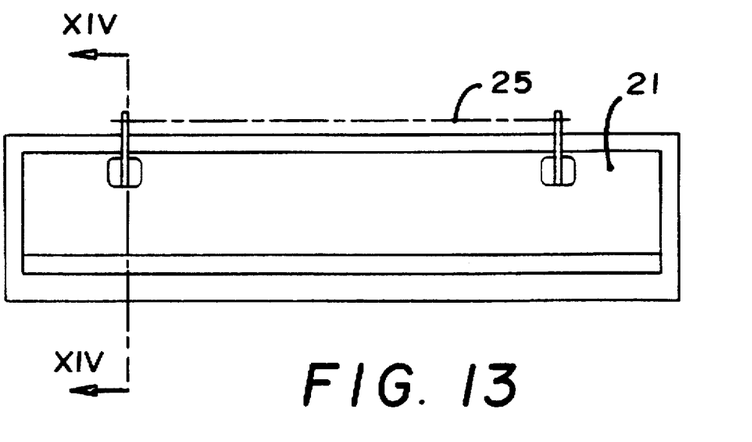
FIG. 13, is a plan view of another alternative thrust reversing reverser panel.
Figure 14:
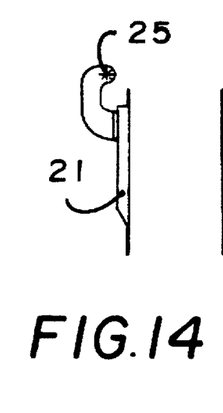
FIG. 14 is a cross-sectional view taken along line XIV—XIV in FIG. 13.

FIGS. 9 and 10 illustrate the principals of the present invention utilized in conjunction with a known thrust reverser door disclosed in French Patent 2,638,784 which has an internal gas flow duct 33. Again, the use of the thrust reverser panel 21 and its particular orientation will provide a smooth transition of the gas flow 15 through the duct 33, thereby improving the efficiency of this device.

Depending upon the requirements of each particular application, the thrust reverser panel 21 may assume different shapes as illustrated in FIGS. 11, 12, 13 and 14. The panel 21 may have forward or rear cut-out portions which may be adapted to allow satisfactory cooperation with the remaining thrust reverser components. Also, various hinge configurations may be utilized with the thrust reverser panel 21 as illustrated in these figures. In each case, however, the width of the thrust reverser panel 21 is less than that of the associated thrust reverser door 7. To ensure efficient sealing, the thrust reverser panel 21 may be comprised of one or more portions mutually overlapping in the forward thrust position, such parts having different aperture angles in the reverser thrust positions.

Figure 15:
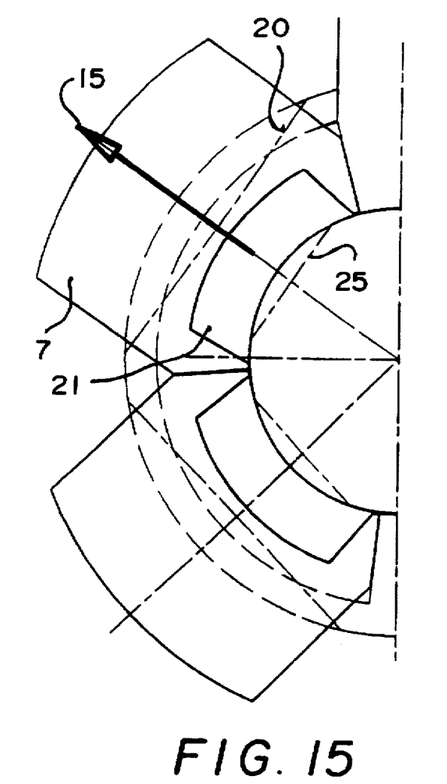
FIG. 15 is a partial, cross-sectional view taken along line XV—XV in FIG. 4 illustrating the direction of the thrust reversing gases in a radial direction.
Figure 16:
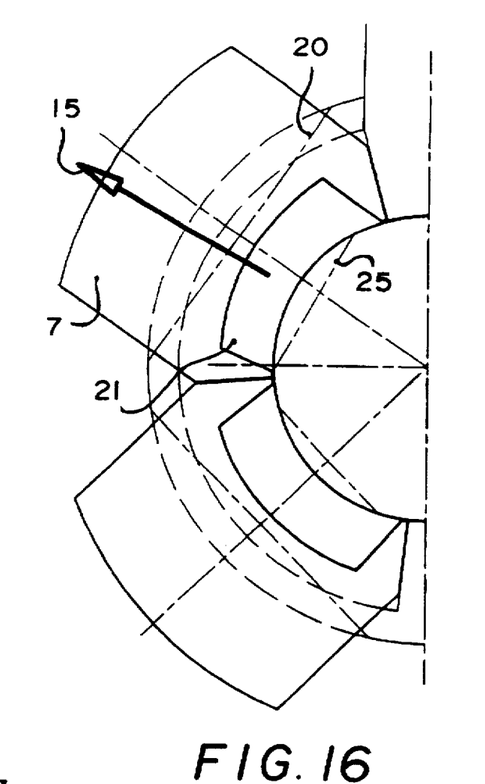
FIG. 16 is partial, cross-sectional view similar to FIG. XV, but illustrating the alternative direction of the thrust reversing gases in a non-radial direction.
Figure 17:
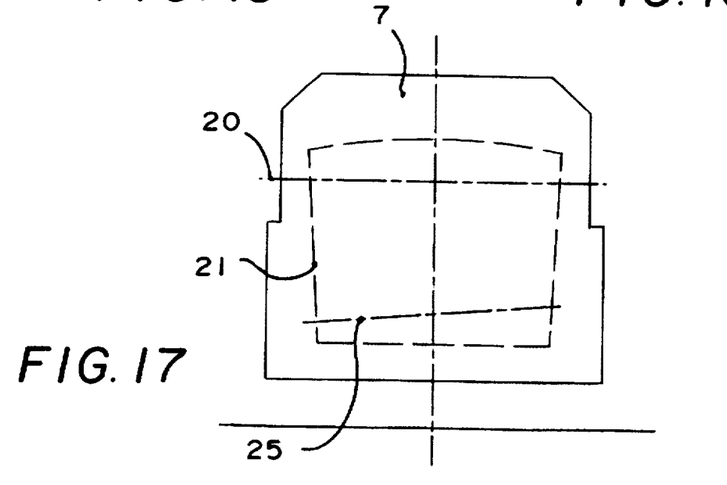
FIG. 17 is a schematic view viewed in the direction of arrow F in FIG. 3 illustrating the thrust reverser door and the thrust reverser panel.

Orientations of the pivot axes 20 and 25 may also be varied dependent upon the particular application. These axes may be parallel, or may be skewed relative to each other as illustrated in FIG. 17. If the axes 21 and 25 are parallel, the gas flow 15 will be directed outwardly from the outer cowling 1 in a generally radial direction as illustrated in FIG. 15. If it is desired to direct the reverse thrust gas flow in a particular direction, so as to avoid contact with the ground, or an adjacent portion of the aircraft, one of the pivot axes 20 and 25 may be skewed relative to the other so as to direct the reverse thrust gases 15 in the desired direction as illustrated in FIG. 16. The pivot axis 25 may be offset relative to the median axis of the thrust reverser panel 21 and also relative to the forward and rear sides of the panel 21.

The foregoing description is provided for illustrative purposes only which should not be construed as in any way limiting this invention, the scope of which is defined solely by the appended claims.

I claim:

1. A thrust reverser for a turbojet engine having an outer cowling and an inner cowling forming a generally annular gas flow duct therebetween, the thrust reverser comprising:

a) at least one thrust reverser door pivotally attached to the outer cowling so as to pivot about a first stationary axis to move between a forward thrust position and a reverse thrust position;

b) at least one thrust reverser panel pivotally attached to the inner cowling so as to pivot about a second stationary axis to move between a forward thrust position and a reverse thrust position in which the panel extends into the gas flow duct obliquely to a flow of gas flowing through the gas flow duct; and, c) a connecting device connecting the at least one thrust reverser door to the at least one thrust reverser panel such that when the at least one thrust reverser door is in the reverse thrust position, the at least one thrust reverser panel is in the reverse thrust position and when the at least one thrust reverser door is in the forward thrust position, the at least one thrust reverser panel is in the forward thrust position.

2. The thruster reverser of claim 1 wherein the at least one thrust reverser panel has front and rear portions and wherein the second stationary axis is located adjacent to the front portion such that, when the at least one thrust reverser panel is in the reverse thrust position, the rear portion extends into the annular gas flow duct.

3. The thrust reverser of claim 2 wherein the first stationary axis is located to the rear of the second stationary axis.

4. The thrust reverser of claim 1 wherein the at least one thrust reverser panel has front and rear portions and wherein the second stationary axis is located adjacent to the rear portion such that, when the at least one thrust reverser panel is in the reverse thrust position, the front portion extends into the annular duct.

5. The thrust reverser of claim 1 wherein the connecting device comprises at least one linkrod, a first pivot pivotally connecting the linkrod to the at least one thrust reverser door and a second pivot pivotally connecting the linkrod to the at least one thrust reverser panel.

6. The thrust reverser of claim 5 wherein the at least one thrust reverser panel has a front and a rear, and wherein the second pivot is located between the rear and the second stationary axis.

7. The thrust reverser of claim 5 wherein the at least one thrust reverser panel has a front and a rear, and wherein the second pivot is located between the front and the second stationary axis.

8. The thrust reverser of claim 1 further comprising a seal located between the at least one thrust reverser panel and the inner cowling when the at least one thrust reverser panel is in the forward thrust position.

9. The thrust reverser of claim 1 wherein the first and second stationary axes are substantially parallel.

10. The thrust reverser of claim 1 wherein the first and second stationary axes are non-parallel.

11. The thrust reverser of claim 1 further comprising an actuator connected to the at least one thrust reverser panel to move the at least one thrust reverser panel and the at least one thrust reverser door between their forward and reverse thrust positions.

12. The thrust reverser of claim 11 wherein the actuator comprises a power cylinder having a movable piston rod connected to the at least one thrust reverser panel.

* * * * *